Sept. 27, 1960
M. S. CLARK
2,954,245
DISPENSING DEVICE
Filed June 24, 1955
3 Sheets-Sheet 1
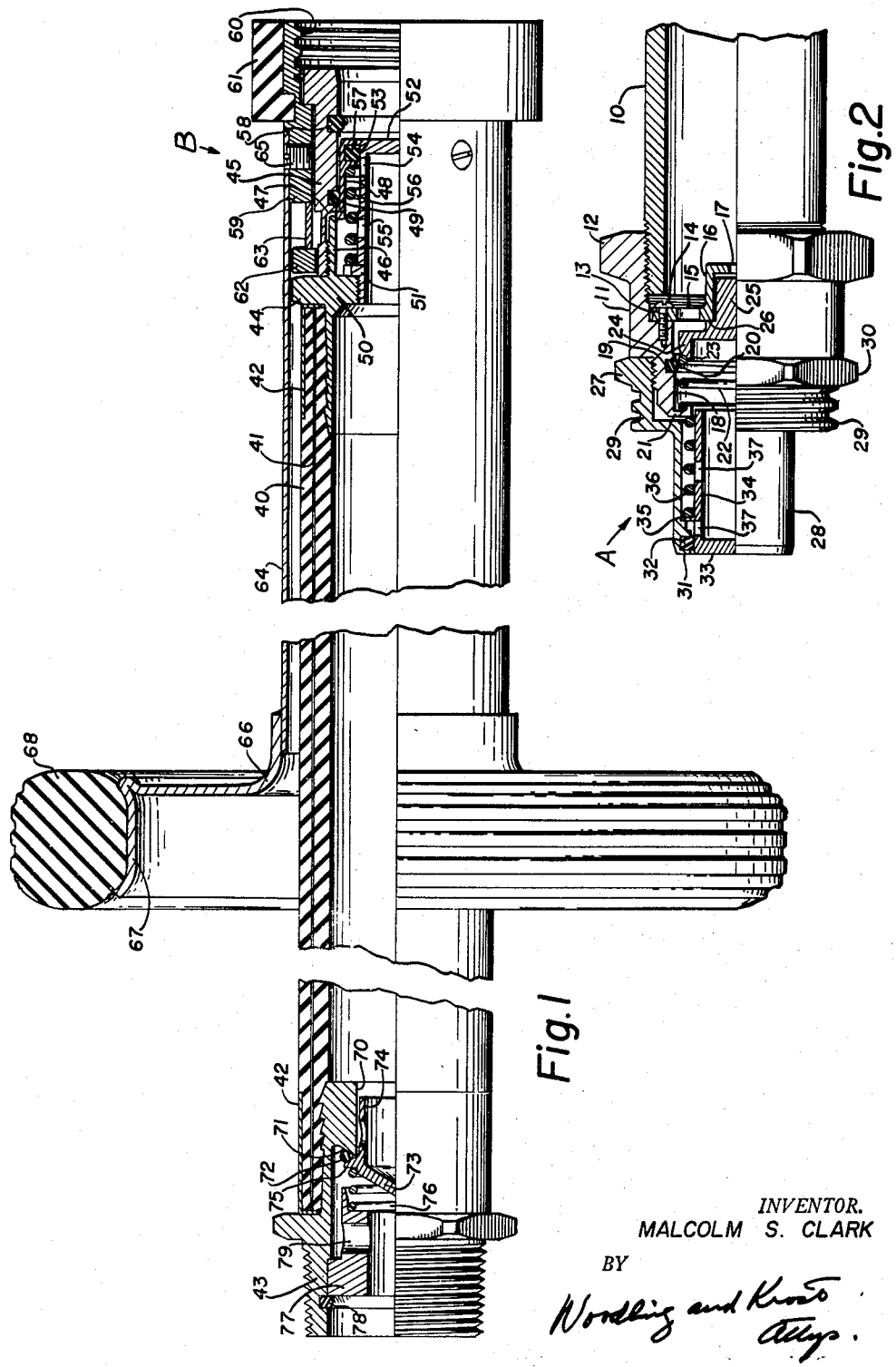
INVENTOR.
MALCOLM S. CLARK
BY Sept. 27, 1960     M. S. CLARK     2,954,245
DISPENSING DEVICE Filed June 24, 1955          3 Sheets-Sheet 2

INVENTOR.
MALCOLM S. CLARK
BY
Woodling and Krost
attys.

Sept. 27, 1960　　　　M. S. CLARK　　　　2,954,245
DISPENSING DEVICE

Filed June 24, 1955　　　　　　　　　　3 Sheets-Sheet 3

INVENTOR.
MALCOLM S. CLARK
BY

United States Patent Office 2,954,245
Patented Sept. 27, 1960

2,954,245

DISPENSING DEVICE

Malcolm S. Clark, Union City, Pa., assignor to Snap-Tite, Inc.

Filed June 24, 1955, Ser. No. 517,817

4 Claims. (Cl. 285—38)

This invention relates to dispensing devices of the general type used for the conveyance of a fluid medium from a source which may be fixed or movable, to a movable depository, such as found in hoses or lines for dispensing gasoline from a pump to a vehicle or between two movable vehicles.

An important object of the invention is the provision of a dispensing device including a supply line, which when used for conveying a fluid medium between relatively movable tanks or other places, and a leak or break occurs in the line, the flow of the fluid medium will be stopped to prevent waste and fire hazards.

More particularly, the invention contemplates a dispensing device which includes a detachable conduit adapted to be connected with and disconnected from a supply line, and wherein each of which is provided with valve means to automatically close upon disconnection of the conduit to trap the fluid medium in both the source and the detachable conduit.

Another object is the provision of a source or filling plug which includes both a normally open check valve held open against fluid pressure by spring action and a valve which closes upon disconnection of the detachable conduit from the filling plug and which opens upon connection of the conduit with the plug. This conduit contains two valves which open upon connection of the conduit with the plug and which close upon disconnection of the conduit therefrom.

Another important object is the provision of a flexible conduit with means operable without exhaustive stooping to couple it with the filling plug usually located near ground level and which is made easy to handle, and is provided with electrical insulation and shock proofing.

Another object is the provision of a flow control check valve having a valve seat arranged between the input and output sides of the device with a check valve having a pressure head area related to the bore through the device and to the tension of a spring for normally biasing the valve off its seat to remain open against the pressure flow stream until predetermined limits of pressure variances and/or rates of flow are exceeded which will cause the valve to close automatically.

A further object is the provision of a flow control check valve which incorporates a valve mechanism and a weakened section on the output side thereof which, when subjected to undue strain by accident, will give way to cause such variance of pressure and/or rate of flow to effect automatic closing of the valve mechanism.

A further object is the provision of flow control check valve which includes a dash-pot action to preclude fluctuation and chatter of the valve.

Another object of the invention is the provision of a valve with the pressure head having a reduced diameter at one end to provide clearance for fluid flow and to provide a stop to regulate the flow through the valve and a combined valve guide and piston providing dash-pot action on the input or pressure side of the valve.

Still another object is the provision of a flow control check valve having fixed operational limits with no manual adjustment provisions to be tampered with after its manufacture.

Another object is the provision of a dispensing device which is provided with a simple but extremely durable construction which is easily assembled and taken apart for replacements.

Other objects and a fuller understanding of this invention may be had by referring to the following description and claims, taken in conjunction with the accompanying drawings, in which:

Figure 1 is a side elevational view of part of the dispensing device with the upper half thereof shown in longitudinal section;

Figure 2 is a side elevational view of a second part of the dispensing device with the upper half thereof shown in longitudinal section;

Figure 3:
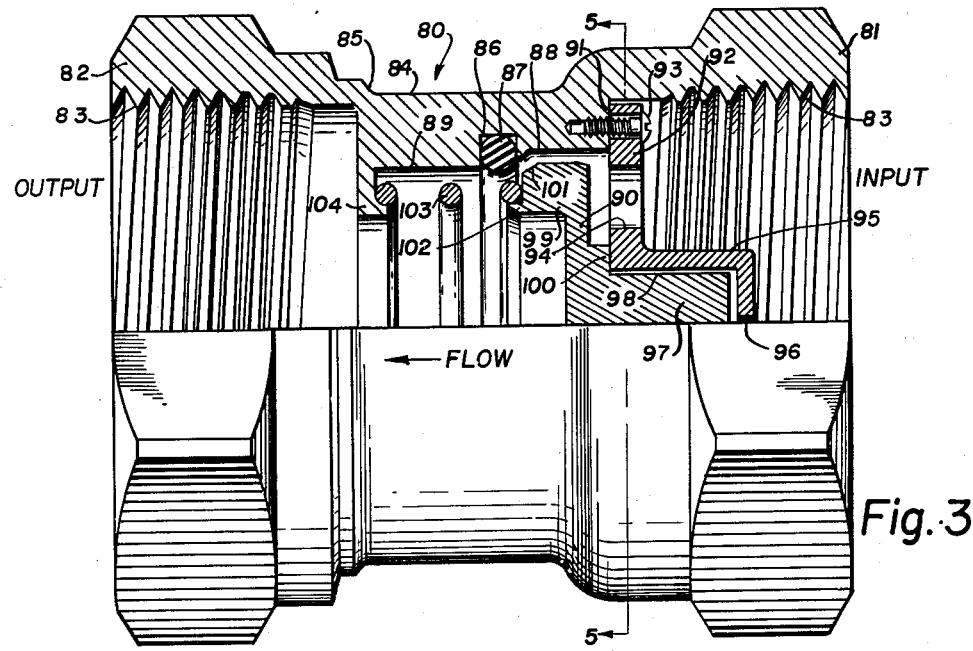
Figure 3 is a side elevational view of a modification of the flow control check valve shown in Figure 2 and with its upper half shown in longitudinal section with the valve in open position.

Referring now more particularly to the drawings wherein a preferred form of the invention is illustrated, the numeral 10 designates a pipe end of a source of supply of fluid medium to which a nipple assembly including an excessive flow check valve is threaded or otherwise secured. This nipple assembly includes an adaptor body 11 having an enlarged polygonal end 12 threaded upon the supply pipe 10. This end of the adaptor has an enlarged input bore providing an annular seating shoulder on which a valve guide 13 is fastened by means of screws 14. This guide is in the form of a disc or plate having such number of relatively large flow openings 15 as to assure full capacity flow through the adaptor. This guide is provided nearest the input side of the adaptor with a central axial closed cylindrical cup or dash-pot 16 extending axially into the enlarged input end of the adaptor. The closed bottom or end of the pot is provided with a relatively small central opening 17 in communication with the input end and source of supply under pressure. This adaptor is provided at its other end with a smaller bore 18 which constitutes the output end of the adaptor and the intermediate portion of this bore is provided with an annular groove 19 for the reception therein of a resilient packing, preferably in the form of a rubber O-ring 20 to form a valve seat. The output end of the adaptor is provided with an inward flange section or lip 21 forming a seat for one end of a preloaded coiled compression spring 22. The other end of this spring is seated upon an axially extending reduced ledge 23 formed upon one end of a valve body 24 having a beveled portion adapted to seat upon the O-ring 20. This valve body is provided with a reduced axial extension 25 to operate within the dash-pot 16 and to provide a stop shoulder 26 which is normally biased against the valve guide 13 to normally hold the enlarged body portion of the valve in spaced relation to the valve guide to permit freedom of flow of the fluid medium through the nipple assembly.

The output end of the adaptor 11 is reduced and externally threaded to connect the enlarged end 27 of a nipple 28 thereto. This enlarged end of the nipple is provided with an external fast thread 29 and an enlarged polygonal section 30 by which it is gripped and threaded to the adaptor to compress a suitable gasket or sealing means therebetween. The nipple 28 in other respects is identical to the nipple of a quick detachable coupling shown in detail in my copending application Serial No. 508,620, filed on May 16, 1955, now Patent 2,854,259. The extremity of this nipple is provided with inturned flanges 31 forming a groove for a rubber O-ring 32, which forms a second valve seat for the nipple assembly. Cooperating with this seat 32 is a second normally closed valve body 33 like that disclosed in the aforesaid pending application. This valve 33 is provided with a sleeve portion 34 having a stop shoulder 35 which is normally biased against a shoulder in the nipple by a compression spring 36 surrounding the sleeve and having its inner end abutting the inturned flange portion 21 of the adaptor 11. This sleeve portion of the valve is also provided with a series of ports 37 on opposite sides of the stop shoulder 35 so that when the valve body is moved off its seat 32 the fluid medium under pressure in the nipple assembly will flow past the valve 24, into the sleeve portion of valve 33 and thence through the ports 37 past the valve seat 32. Normally, the valve body 33 is biased to a closed position upon its seat 32 and with its stop shoulder 35 engaging the stop shoulder within the nipple to stop the flow of medium through the nipple assembly.

In order to conduct the fluid medium from the nipple assembly A to a point of use such as the tank of a vehicle, a hose and coupler assembly B, as shown in Figure 1, is adapted to be connected with the nipple assembly A. This hose and coupler assembly B includes a length of rubber hose 40, preferably of about a five foot length, which has static ground and reinforcing wires 41 embedded therein and connected with metallic ferrules 42 on the ends of the hose. Into the ends of the hose are inserted the barbed portions of adaptors 43 and 44. The adaptor 44 on the input end of the hose is generally of the same construction as the coupler unit disclosed in the aforesaid pending application and in the present illustration includes an axially extending sleeve portion 45 threadedly connected to an internal axially extending sleeve portion 46 of the adaptor. The end of the sleeve 45 nearest the sleeve portion 46 is counterbored to receive this sleeve portion 46 and to provide an annular stop shoulder 47 which limits the closing movement of a valve sleeve 48. For this purpose, the valve sleeve is provided with an outwardly extending annular rib which slides on the inner surface of the flange portion 46 and is adapted to contact the shoulder 47 for limiting closing movement of the valve sleeve. This valve sleeve 48 is slidably mounted upon rubber sealing means 49 in the form of an O-ring mounted in a groove in the inner wall of the coupler sleeve 45. When the valve sleeve 48 is moved to a fully open position, it abuts an inwardly extending annular member 50 of the adaptor 44.

To this inwardly extending portion 50 is threaded a hollow projection 51 which extends axially of the adaptor to terminate in a closed end 52 having an annular valve seating portion 53 adjacent thereto. Adjacent the valve seat 53, the tubular extension is provided with eight holes 54 arranged circumferentially thereof at about forty-five degrees apart, and spaced further inwardly is a second set of circumferentially spaced ports 55 in the tubular extension in a series of six holes arranged approximately sixty degrees apart. A valve sleeve operating spring 56 surrounds the tubular extension 51 and abuts an inwardly extending flange of the valve sleeve 48 to normally bias a resilient sealing ring 57 of the valve sleeve into engagement with the beveled seat 53.

The interior surface of the coupler sleeve 45 forms a socket for the reception of the nipple 28 and is provided with secondary sealing means 58, preferably in the form of a rubber O-ring. Rotatably mounted on the coupler sleeve 45 is a nut body 59 having one end projecting beyond the end of the coupler sleeve 45 and provided with an internal fast thread 60, preferably on the order of a 2⅛ stub Acme thread to cooperate with the corresponding thread 29 of the nipple assembly and thereby provide interlocking means between the nipple and coupler assemblies, which constitute first and second complementary coupling means. Surrounding this threaded portion of the nut body is a rubber tire annulus 61 secured thereto in any suitable manner. This nut body is spaced from the adaptor 44 by means of a spacer ring 62 and a second divided spacer ring 63.

In order to be able to rotate the nut body 59 to couple it with and uncouple it from the nipple assembly A without requiring an operator to stoop to ground level, an elongated aluminum operating tube 64 encircles a portion of the rubber hose 40 and is secured to the nut body by means of the screws 65. This operating tube 64 is quite long and extends a distance along the hose several times the length of the coupler sleeve 45 where it is fastened to a hub 66 terminating in a felly flange 67, to which a rubber tire 68 is secured to form a handle for operating the nut body 59. This tube 64 stiffens and protects the hose 40.

The outermost end of the hose 40 has its adaptor 43 provided with a reduced bore 70 and a conical valve seat 71 upon which may be disposed sealing means in the form of a rubber O-ring 72. A normally closed check valve 73 has a ported skirt 74 slidably mounted in the bore 70 and an outwardly extending beveled flange 75 adapted to be pressed against the resilient ring 72 by means of a compression coil spring 76. This spring abuts one end of a valve guide 77 removably anchored in the bore of the adaptor 43 by means of a retainer ring 78. The body of this valve guide is spaced from the bore of the adaptor and is provided with fluid ports 79 to allow the passage of the fluid medium through the ported skirt 74 of the valve when it is moved to an open position by pressure within the hose. Whenever pressure within the hose decreases below that of the pressure beyond the adaptor 43, spring 76 immediately causes the valve to close to confine the medium within the hose and thereby prevent its leakage or spillage.

The opposite end of the hose 40 is also immediately closed by the valve sleeve 48 being forced to its seat 53 whenever the hose and coupler assembly B are disconnected from the nipple assembly A. At the same time the hose is disconnected from the nipple assembly, the valve sleeve 34 of the latter is immediately forced to its seat 32, thus cutting off loss of fluid medium from the nipple assembly. When the hose and coupler assembly B is connected by the threads 29 and 60 to the nipple assembly A, the valve sleeve 34 will be moved to open position by its engagement with the tubular extension 51 of the coupler assembly, while the valve sleeve 48 will be moved axially by the nipple 28 abutting the valve sleeve to move it off its seat 53 thereby opening the valves 34 and 48 of the coupling to allow fluid medium to pass under pressure from the nipple into the hose 40 and thence to unseat the check valve 73 and allow the fluid medium to pass on through the output end of the adaptor 43. Should the nipple 28 become broken, a reduction of fluid pressure will occur on the output side of the adaptor 11 thereby causing fluid pressure behind the check valve 24 to move the same against the tension of spring 22 to seat this valve upon its seat 19 and thereby cut off any further passage of the fluid medium to the output side of the nipple assembly.

The type of flow control check valve 24 illustrated in Figure 2, when installed alone in a fluid pressure stream or line leading to an output unit, is useful where any loss of pressure in the line beyond the point of installation below a predetermined pressure or rate will cause the valve to close, and is especially useful in the handling of inflammable fluids where there is danger of a break or leak occurring in the output unit or end of the line which would cause spillage or pressurized spray of the inflammable fluid. An example of such use is where a valve is installed in a pressure line leading to a dispensing unit of a gasoline service island. Should an accident occur, such as an automobile accidentally moving to break the pressure line on the output side thereof, this valve will automatically close to eliminate spillage under pressure and will thereby serve to reduce fire and other hazards.

The body or casing 80 of this valve and other parts of the device may be made of various ferrous and non-ferrous, non-corrosive metals depending upon the medium to be handled. It may be made in one or more pieces, but as shown in the modification illustrated in Figures 3 to 6 inclusive is preferably a one-piece casing with enlarged hexagonal ends 81 and 82 equipped with internal American standard taper dry seal pipe threads 83 or other means for connection with a fluid pressure line. The end 81 is the input pressure end connectable with the up-stream portion of a pressure line, while the end 82 is the output end connectable with the down-stream portion of the line. The mid-section 84 of the valve casing or chamber is of a smaller outside diameter than the ends and is made of a thick walled section continued out through the input end 81 as illustrated. The casing at the juncture 85 between the mid-section 84 and the output end 82 is weakened by making it decidedly thinner in wall thickness than the section of the casing on the opposite side of the juncture, so that any undue strain by accident placed upon the casing will cause a fracture or break to occur at the weak point 85. The weakening of the juncture 85 can also be provided by grooving the valve casing at this point. The thicker wall section of the mid-section 84 provides the casing with an internal bore of smaller diameter than at the two ends of the casing. The intermediate portion of this bore is provided with an annular groove 86 for the reception therein of a resilient packing preferably in the form of a rubber O-ring 87 to form a valve seat. This reduced bore at the input side 81 of the casing and at the input side of the seat is designated by the numeral 88 and is larger in diameter than the portion 89 of this bore at the opposite side of the seat to expose more of one side of the O-ring to the flow to accommodate a larger valve body 90 and at the same time provide for a large flow channel through the valve. This enlarged bore 88 provides the input end of the casing with an annular shoulder or seat 91 to which a valve guide 92 may be attached in any suitable manner, but preferably by means of screws 93.

The valve guide 92 is in the form of a disc or plate having such number of relatively large flow openings 94 as to assure a full capacity flow through the casing. This guide is provided nearest the input side of the casing with a central axial closed cylindrical cup or dash pot 95 extending axially into the enlarged input end 81 of the casing. The closed bottom or end of this pot is provided with a relatively small central opening 96 in communication with the input end 81.

The dash pot 95 slidably receives an axial piston extension 97 of the valve body 90 with a small peripheral clearance 98. A large circular pressure piston head 99 forms an integral part of the piston 97 and is positioned to operate in the enlarged portion 88 of the restricted bore. A reduced portion 100 of this valve head forms an annular shoulder to normally abut the inner face of the guide disc 92 in order to hold the main body portion of the valve head 99 spaced from the inlet openings 94 and to decrease the effective fluid pressure area of this side of the valve body when it is in an open position. The end of the valve head 99 nearest the valve seat 87 is beveled as at 101 to provide an angled seating surface to abut the O-ring 87 to partially close the groove 86 and thereby trap the ring against displacement by fluid pressure when the valve head is in a closed position. The same end of this valve head has an axially extending reduced annular portion or ledge 102 to retain and align one end of a preloaded coiled compression spring 103 with the valve head 99. The other end of this spring abuts an inward flange section or lip 104 extending axially and radially inward as an integral extension of the thickened mid-section 84 on the output end of the casing and inwardly of the weakened section 85. Thus, the beveled surface 101 of the valve will be biased away from the O-ring 87 and the outer diameter of the valve head 99 will be held spaced from the bore portion 88 to allow a free unrestricted flow of fluid at a predetermined rate through the openings 94 in the input side of the valve and past the valve seat 87 to the output side 82.

Figure 4:
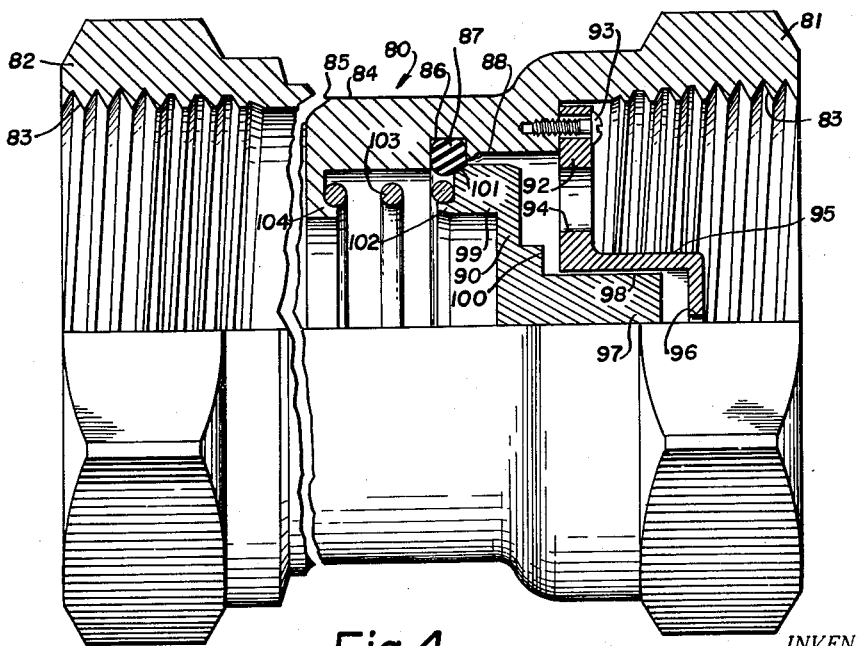
Figure 4 is a similar view showing a weakened section of the valve broken to cause automatic closing of the valve.
Figure 5:
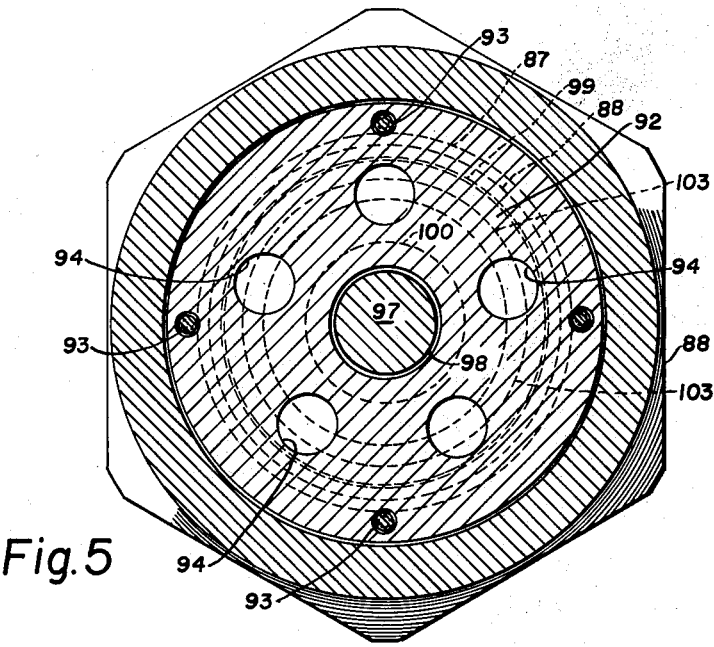
Figure 5 is a transverse section of the valve taken on the line 5—5 of Figure 3.
Figure 6:
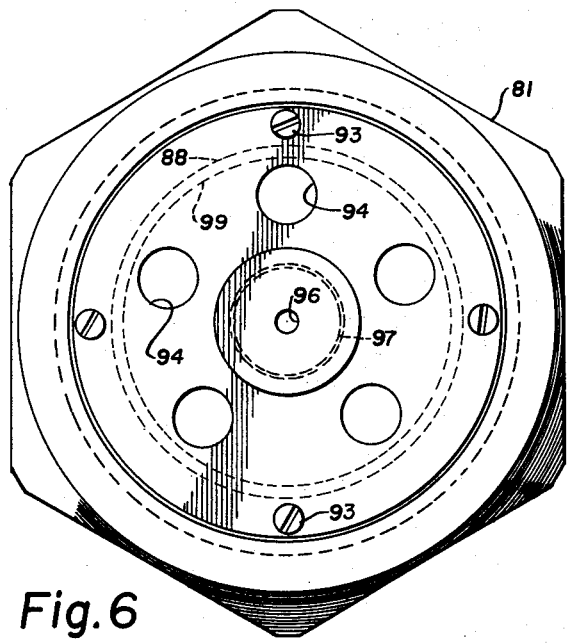
Figure 6 is an end elevation of the input end of the valve.

This spring 103 is tensioned or preloaded to a predetermined degree in its manufacture to bear such ratio with the size of the valve body 90 and the fluid pressures active on the input and output sides thereof as will normally bias and hold the valve body open and away from its seat 87 when the valve casing is installed in a pressure line. In other words, the tension of this spring is regulated according to the fluid pressure area of opposite sides of the valve head of the valve 90. Thus, the valve has a manufactured predetermined fixed limit of operation which cannot be tampered with after installation. In the valve open position shown in Figure 3, the fluid pressure and/or the rate of the flow of fluid from the input to the output side of the valve is in balance, and the added pressure exerted by the spring 103 will hold the valve open in the pressure flow stream. However, should a leak develop on the output side of the valve and line, as when a fracture occurs at the weakened section 85 to lower the output pressure, the input pressure against the body and piston of the valve 90 will immediately move the valve to seat and close against the O-ring 87 as shown in Figure 4 to cut off the flow of fluid through the casing, thereby preventing loss or spray of pressurized fluid. When the check valve is in normal operation with no leak to cause valve closing, the dash-pot action of the piston 97 in the pot 95 in conjunction with the spring action and fluid pressures acting upon opposite faces of the valve body will function to remove all valve fluctuation and chatter. With the check valve 90 in open position with its annular shoulder portion 100 held in contact with the guide plate 92 and out of contact with the input fluid pressure, the fluid pressure operating upon the entire area of the output side of the valve body together with the spring pressure will unbalance pressures acting against opposite faces of the valve body until a sufficient variance of these pressures occurs at opposite sides of the valve to move the shoulder portion 100 away from the guide and allow the input pressure to act against this shouldered portion to add valve closing fluid pressure thereto.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A dispensing device comprising a pair of conduits having first and second complementary coupling means adapted to be coupled and uncoupled for connecting and disconnecting said conduits, one of said conduits comprising an elongated flexible tubular member having a first of said complementary coupling means at one end thereof for connection to and disconnection from said second complementary coupling means, and an elongated rigid operating member connected to said first coupling means and extending lengthwise of said tubular member for a distance several times the length of said coupling means and terminating in a handle portion spaced several times the length of said coupling means from said first coupling means for operating said first coupling means to couple and uncouple it from said second coupling means.

2. A dispensing device comprising a pair of conduits having first and second complementary coupling means adapted to be coupled and uncoupled for connecting and disconnecting said conduits, one of said conduits comprising an elongated flexible tubular member having a first of said complementary coupling means at one end thereof for connection to and disconnection from said second coupling means, and an elongated rigid sleeve surrounding said tubular member and connected to said first coupling means and extending lengthwise of said tubular member a distance several times the length of said coupling means and terminating in a handle encircling said tubular member by which said first coupling means is operated to couple and uncouple it from said second auxiliary means.

3. A dispensing device comprising a pair of conduits having first and second complementary threaded coupling means adapted to be coupled and uncoupled for connecting and disconnecting said conduits, one of said conduits comprising an elongated flexible rubber hose having a first of said complementary coupling means rotatably mounted on one end thereof for connection to and disconnection from said second complementary coupling means, and an elongated rigid operating member connected to said first coupling means and extending lengthwise of said hose and terminating in a handle portion encircling said hose and spaced a substantial distance several times the length of said coupling means from said first coupling means for operating said first coupling means to thread it on and off said second coupling means.

4. A dispensing device comprising an elongated flexible rubber hose having a rigid coupler at one end thereof, a connecting member rotatably mounted on said coupler and having a protective tire thereon, an elongated rigid sleeve surrounding said hose and connected to said rotatable connecting member, said sleeve extending lengthwise of said hose for a distance several times the length of said coupler, and a circular operating handle secured to said sleeve and encircling said hose.

References Cited in the file of this patent

UNITED STATES PATENTS

| | | |
|---|---|---|
| 1,878,002 | Smith | Sept. 20, 1932 |
| 2,179,144 | Buttner | Nov. 7, 1939 |
| 2,190,725 | McBride | Feb. 20, 1940 |
| 2,254,997 | Fisher | Sept. 2, 1941 |
| 2,339,101 | Parker | Jan. 11, 1944 |
| 2,518,988 | Hartley et al. | Aug. 15, 1950 |
| 2,554,390 | Stevenson | May 22, 1951 |
| 2,565,872 | Melsheimer | Aug. 28, 1951 |
| 2,594,626 | Earle | Apr. 29, 1952 |
| 2,649,109 | Samiran | Aug. 18, 1953 |
| 2,665,925 | Fraser | Jan. 12, 1954 |
| 2,690,917 | Chandler | Oct. 5, 1954 |
| 2,739,827 | Krone et al | Mar. 27, 1956 |